(12) United States Patent
Kaneko

(10) Patent No.: US 12,464,249 B2
(45) Date of Patent: Nov. 4, 2025

(54) IMAGE CAPTURING APPARATUS FOR PERFORMING IMAGE RECOGNITION BASED ON EXPOSURE CONDITIONS

(71) Applicant: CANON KABUSHIKI KAISHA, Tokyo (JP)

(72) Inventor: Seigo Kaneko, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 182 days.

(21) Appl. No.: 18/353,710

(22) Filed: Jul. 17, 2023

(65) Prior Publication Data
US 2024/0031683 A1    Jan. 25, 2024

(30) Foreign Application Priority Data

Jul. 19, 2022 (JP) .................................. 2022-114572

(51) Int. Cl.
| | |
|---|---|
| *H04N 23/71* | (2023.01) |
| *H04N 23/611* | (2023.01) |
| *H04N 23/72* | (2023.01) |
| *H04N 23/73* | (2023.01) |
| *H04N 25/51* | (2023.01) |

(52) U.S. Cl.
CPC ............. *H04N 23/71* (2023.01); *H04N 23/72* (2023.01); *H04N 23/73* (2023.01); *H04N 25/51* (2023.01)

(58) Field of Classification Search
CPC ........ H04N 23/71; H04N 23/72; H04N 23/73; H04N 25/51; H04N 25/535; H04N 23/611
See application file for complete search history.

(56) References Cited

U.S. PATENT DOCUMENTS

| | | | | |
|---|---|---|---|---|
| 2012/0201427 A1* | 8/2012 | Jasinski | ............... | H04N 23/684 382/107 |
| 2020/0137281 A1* | 4/2020 | Omori | .................. | H04N 23/611 |

FOREIGN PATENT DOCUMENTS

JP        2020072469 A     5/2020

\* cited by examiner

*Primary Examiner* — Ahmed A Berhan
(74) *Attorney, Agent, or Firm* — Canon U.S.A., Inc. IP Division

(57) ABSTRACT

An image capturing apparatus including an image sensor that can set exposure conditions for each exposure area having one or more pixels, the image sensor capturing an image with the set exposure conditions, acquire an image recognition area where image recognition is to be performed by performing image processing on the image captured by the image sensor, to determine a transition setting of the exposure conditions to be applied to the exposure area corresponding to the image recognition area based on content of the image recognition, and to perform image capturing through the image sensor by applying the transition setting of the determined exposure conditions.

14 Claims, 13 Drawing Sheets

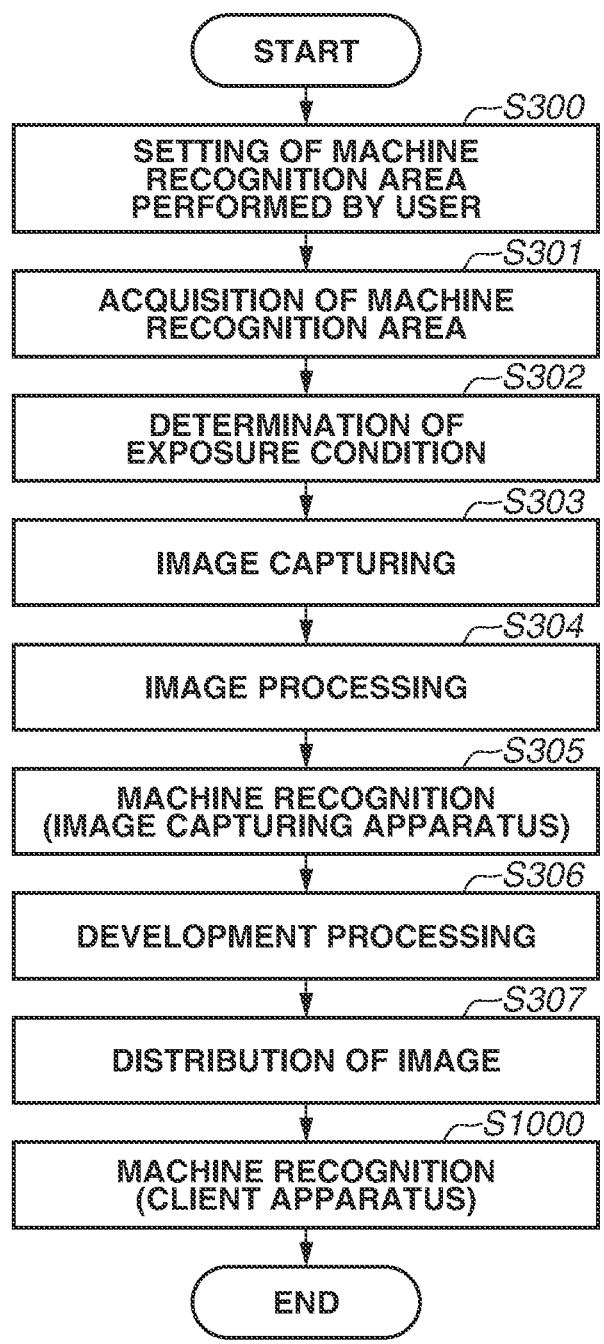

IMAGE CAPTURING APPARATUS FOR PERFORMING IMAGE RECOGNITION BASED ON EXPOSURE CONDITIONS

BACKGROUND OF THE DISCLOSURE

Field of the Disclosure

The present disclosure relates to an image capturing apparatus, a control method, and a storage medium.

Description of the Related Art

There has been a demand for transition settings of automatic exposure (AE) for monitoring through monitoring cameras, which provides high visibility to users. A transition setting of AE for monitoring is a setting which transitions to an exposure condition with appropriate brightness by balancing an exposure time at which motion blur of an object is invisible and analog gain which can cause a considerable increase in noise. On the other hand, there is a setting for transitioning to an exposure condition under which image recognition can easily be made by a camera. A camera to which such a transition setting is applied is called a machine recognition camera. In order to improve the accuracy of machine recognition (image recognition), in some cases, a machine recognition camera makes a transition setting of AE in which the balance between an exposure time and an analog gain is extremely one-sided. For example, to detect an edge on an image, a setting is made to a short exposure time and a high gain that makes up for the exposure amount to eliminate motion blur as much as possible. Further, to perform image comparison using background differences, a setting is made to a low analog gain to reduce noise and a long exposure time to complement the exposure amount. As described above, a transition setting of AE for monitoring and a transition setting of AE for machine recognition are different.

Further, machine recognition may be performed not on the whole area but on a partial area of a captured image. Japanese Patent Application Laid-Open No. 2020-72469 discusses a technique for determining the exposure based on an object detection result acquired through machine recognition.

The technique discussed in Japanese Patent Application Laid-Open No. 2020-72469 changes the brightness of the whole image uniformly. This provides an appropriate brightness on the area subject to machine recognition; however, the brightness of the other area (e.g., an area where the user wishes to perform visual recognition) is not always changed appropriately. Further, Japanese Patent Application Laid-Open No. 2020-72469 does not discuss a transition setting of AE on each area since the technique changes the brightness of the image uniformly (i.e., the whole image). In view of the issue, there is a need in the art for an image capturing apparatus capable of performing appropriate image recognition.

SUMMARY OF THE DISCLOSURE

According to an aspect of the present disclosure, an image capturing apparatus includes an image sensor that can be set exposure conditions for each exposure area having one or more pixels, the image sensor capturing an image with a set exposure conditions, at least one processor, and a memory in communication with the at least one processor, the memory storing instructions that, when performed by the processor, cause the processor to function as an acquisition unit configured to acquire an image recognition area where image recognition is to be performed by performing image processing on the image captured by the image sensor, a determination unit configured to determine a transition setting of the exposure conditions to be applied to the exposure area corresponding to the image recognition area based on content of the image recognition, and an image capturing control unit configured to perform image capturing through the image sensor by applying the transition setting of the exposure conditions determined by the determination unit.

Further features of the present disclosure will become apparent from the following description of exemplary embodiments with reference to the attached drawings.

BRIEF DESCRIPTION OF THE DRAWINGS

FIG. 10 is a flowchart illustrating an example of processing to be performed by an image capturing system according to the third exemplary embodiment.

DESCRIPTION OF THE EMBODIMENTS

Hereinafter, exemplary embodiments of the present disclosure will be described in detail with reference to the appended drawings. The exemplary embodiments are merely examples for realizing the present disclosure, and should be modified or changed as appropriate depending on a configuration and various types of condition of an apparatus to which the present disclosure is applied. The present disclosure therefore is not limited to the following exemplary embodiments. Further, a part of the exemplary embodiments may be combined as appropriate.

Figure 1A:
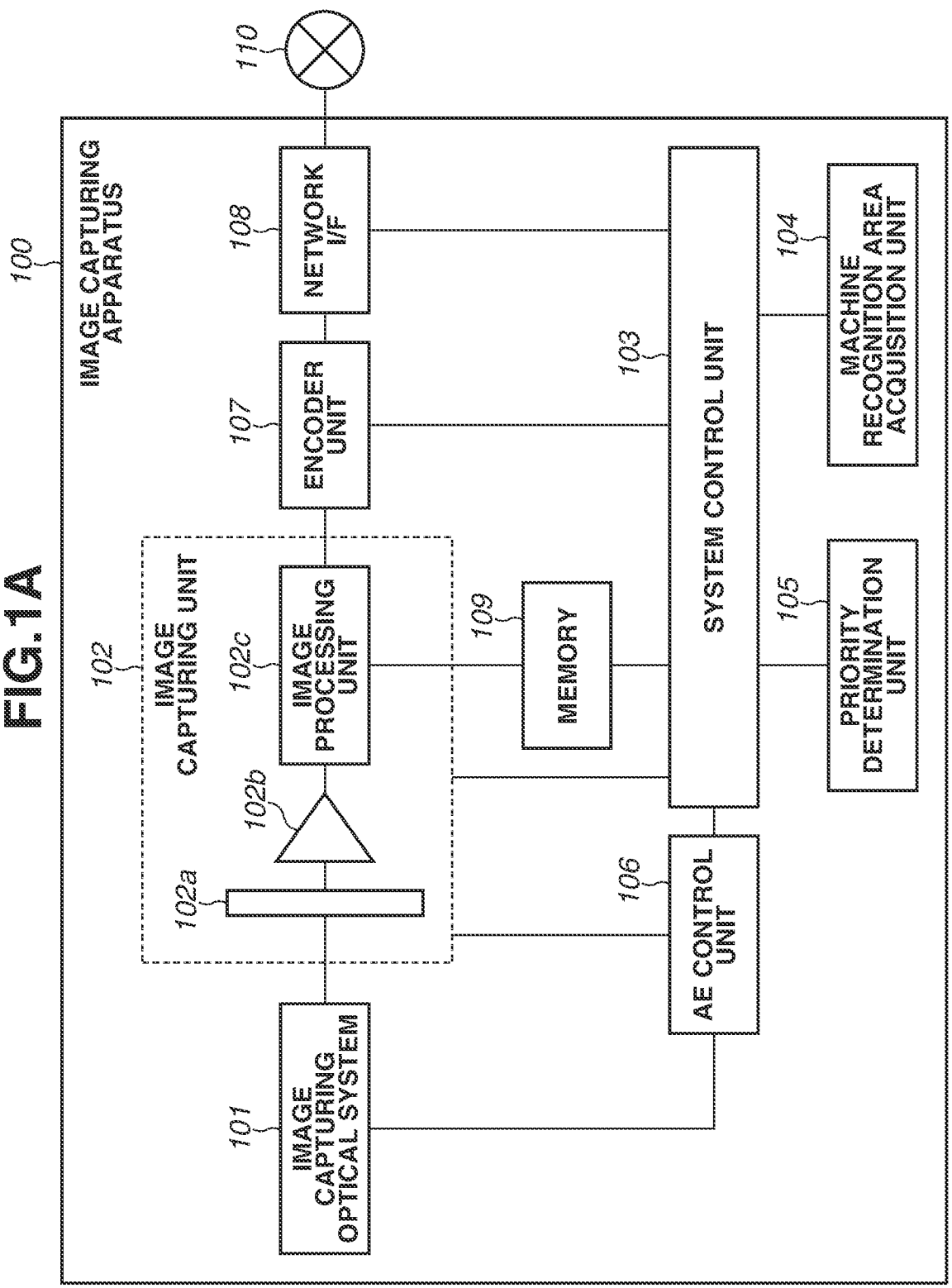
FIG. 1A is a block diagram illustrating an example of a functional configuration of an image capturing apparatus according to a first exemplary embodiment of the present disclosure.

FIG. 1A is a block diagram illustrating a functional configuration of an image capturing apparatus 100 according to a first exemplary embodiment of the present disclosure.

The image capturing apparatus 100 includes an image capturing optical system 101, an image capturing unit 102, a system control unit 103, a machine recognition area acquisition unit 104, a priority determination unit 105, an auto-exposure (AE) control unit 106, an encoder unit 107, a network interface (I/F) 108, and a memory 109. The image capturing unit 102 includes an image sensor 102a, an amplification unit 102b, and an image processing unit 102c. Examples of the memory 109 include a volatile memory, such as a static random access memory (SRAM) or a dynamic random access memory (DRAM), and a non-volatile memory, such as a flash memory. For example, the image capturing apparatus 100 is a monitoring camera.

The image capturing optical system 101 condenses light from an object on the light receiving surface of the image sensor 102a. The image capturing optical system 101 includes one or more lenses. For example, the image capturing optical system 101 includes a zoom lens, a focus lens, and a camera-shake correction lens.

The image capturing unit 102 captures an image of an object to generate an image. The image sensor 102a converts light from an object to an electric signal for each pixel, and outputs the electric signal, the light being condensed on the imaging surface (light receiving surface) by the image capturing optical system 101. The image sensor 102a has an exposure area where an exposure time and an analog gain can independently be set (changed) for each pixel or each pixel block on the imaging surface. Herein, a pixel block is a group of pixels consisting of one or more pixels, and for each pixel block, a different exposure time or a different analog gain can be set. A pixel block may consist of a single pixel or a plurality of pixels. A pixel block does not always have to form a rectangular shape and can form any shape. In the present exemplary embodiment, each pixel block forms a rectangular shape (block shape). The image sensor 102a is an integrated circuit (IC) chip in which pixels consisting of photoelectric conversion elements are arrayed in a matrix.

The image sensor 102a is a sensor, such as a charge coupled device (CCD) sensor or a complementary metal oxide semiconductor (CMOS) sensor. The image sensor 102a mainly has high sensitivity to visible light, each pixel in which has high sensitivity to the corresponding one of the colors, red (R), green (G), and blue (B), and also has a certain degree of sensitivity to infrared light. Thus, the image sensor 102a can clearly capture an image of an object exposed to sun light, as well as an image of an object on an area illuminated with infrared illumination.

The amplification unit 102b amplifies and outputs the electric signal output from the image sensor 102a. The signal amplification rate (analog gain) of the amplification unit 102b can be set or changed for each pixel or each pixel block of the image sensor 102a.

The image processing unit 102c converts the electric signal output as an analog signal from the amplification unit 102b into a digital signal through analog/digital (A/D) conversion. The image processing unit 102c further performs signal processing, such as de-mosaic processing, white balance processing, and gamma processing, on the digital signal acquired through the A/D conversion and generates a digital image. Further, the image processing unit 102c performs brightness correction by amplifying or attenuating a digital signal of an image signal corresponding to a pixel or a pixel block based on the analog gain for each pixel or each pixel block. The generated digital image is temporarily stored in the memory 109. At this time, the image processing unit 102c outputs an image file or a moving image file in a predetermined format, such as JPEG, H.264, or H.265, to the memory 109. In addition, training data used for the machine recognition processing is also stored in the memory 109.

The image processing unit 102c further performs machine recognition processing on images (i.e., image recognition processing performed by a camera). The machine recognition processing on images is generally classified into two types. One of the two types is the processing of performing machine recognition on images based on a temporal change in luminance (also called "temporal recognition processing"). The other is the processing of performing machine recognition on images based on a spatial change in luminance (also called "spatial recognition processing"). These two types of machine recognition processing will be described below in detail.

In FIG. 1A, although the amplification unit 102b and the image processing unit 102c are illustrated as elements separated from the image sensor 102a, the image sensor 102a may include all or a part of the amplification unit 102b and the image processing unit 102c.

Further, in FIG. 1A, although the image capturing apparatus 100 includes the image capturing optical system 101, the image capturing optical system 101 may be attachable to and detachable from the image capturing apparatus 100, such as an interchangeable lens. In other words, the image capturing apparatus 100 does not always have to include the image capturing optical system 101 as its own constituent element.

The system control unit 103 includes a central processing unit (CPU) (see FIG. 1B), and generally controls the respective constituent elements of the image capturing apparatus 100 and performs setting of various parameters. The system control unit 103 generally perform control so that the respective elements constituting the image capturing apparatus 100 operate cooperatively to each other. For example, the system control unit 103 controls the image capturing optical system 101. More specifically, the system control unit 103 performs optical control of an optical zoom magnification, an F-number, and a focal length. The system control unit 103 can be called "image capturing control unit" because the system control unit 103 performs image capturing through the image sensor 102a.

The machine recognition area acquisition unit 104 determines a pixel or a pixel block where machine recognition is to be performed, and outputs the determined pixel or pixel block as a machine recognition area (image recognition area). The user can manually specify a machine recognition area via the network I/F 108. Further, the image capturing apparatus 100 may automatically specify (automatically set) a machine recognition area based on a result of machine recognition. For example, the machine recognition area acquisition unit 104 of the image capturing apparatus 100 performs moving object detection on the whole or a partial area of an image, and automatically sets an area where a moving object is detected as a machine recognition area. Further, the machine recognition area acquisition unit 104 performs human body identification for identifying whether the moving object on the machine recognition area is a human body.

The priority determination unit 105 determines the priority of the exposure time and the analog gain of the image capturing unit 102. A longer exposure time increase its exposure amount, also increasing motion blur caused by movement of an object or the image capturing apparatus 100. A higher analog gain increases the exposure amount, also increasing noise. The priority determination unit 105 assigns different priorities to the exposure time and the analog gain between a non-machine recognition area (i.e., area where recognition is performed by a human) and a machine recognition area.

Priorities will now be described.

Recognition processing is not performed mechanically in the non-machine recognition area. In the non-machine recognition area, the exposure time and the analog gain each make auto-exposure (AE) transition by stages to provide a less sense of awkwardness a user feels while looking at an image with his or her own eyes. In other words, a transition setting of AE which places an importance on the human visibility is applied to the non-machine recognition area. Thus, the exposure time and the analog gain are set on an equal priority or similar priorities. In the present exemplary embodiment, AE is an exposure amount determined by the exposure time and the analog gain.

In the machine recognition area, different priorities are assigned to the exposure time and the analog gain depending on a type (details) of machine recognition, and an appropriate exposure amount is set through an AE transition.

In the temporal recognition processing, an AE transition is made with the analog gain placed on high priority. In other words, in the temporal recognition processing, after the analog gain is determined and fixed, an AE transition is made depending on the exposure time (i.e., adjustment of the exposure amount).

In the spatial recognition processing, an AE transition is made with the exposure time placed on high priority. In other words, in the spatial recognition processing, after the exposure time is determined and fixed, an AE transition (i.e., adjustment of the exposure amount) is made depending on the analog gain.

The AE control unit 106 determines and controls exposure conditions based on the luminance of each pixel or each pixel block and the priority determined by the priority determination unit 105. For example, the AE control unit 106 determines an exposure amount (exposure time+analog gain) to make the average value of luminance of each pixel or each pixel block a median value of gradation of data outputtable. Further, after either the exposure time or the analog gain is determined based on the priority determined by the priority determination unit 105, the exposure amount determined by the other is set through adjustment. The exposure of the image sensor 102a is controlled by the exposure time and the analog gain determined above. In other words, the image sensor 102a performs image capturing with the determined exposure condition transition settings.

The encoder unit 107 performs encoding processing to encode image data processed by the image processing unit 102c into image data in a predetermined file format, such as motion JPEG, H.264, or H.265.

The network I/F 108 is an interface used for communicating with an external information processing apparatus (e.g., the client apparatus 210 in FIG. 2) and a storage apparatus (e.g., the server 220 in FIG. 2) via the network 110. The image data encoded by the encoder unit 107 through the encoding processing can be transmitted to the information processing apparatus (the client apparatus 210) and the storage apparatus (the server 220) via the network I/F 108. The network I/F 108 receives a specification of an area subject to machine recognition and a specification of a type of machine recognition from the information processing apparatus (the client apparatus 210). The network I/F 108 further receives a command for controlling the pan/tilt/zoom operation of the image capturing apparatus 100 from the information processing apparatus (the client apparatus 210).

For example, the network 110 is a local area network (LAN) which includes a router compliant with a communication standard, such as Ethernet®. The image capturing apparatus 100, the information processing apparatus (the client apparatus 210), and the storage apparatus (the server 220) are connected to each other through a LAN cable. In addition, the network 110 may include a wireless network, such as the internet. In this case, the image capturing apparatus 100, the information processing apparatus (the client apparatus 210), and the storage apparatus (the server 220) may be connected to each other through a wireless network.

The two types of machine recognition processing and a transition setting of AE will now be described. First, temporal recognition processing is machine recognition processing in which a temporal change in luminance is calculated. In the temporal recognition processing, a plurality of images in a row is captured at an angle of view, and a change in luminance in each image or each area in an image is calculated. If an amount of temporal change in luminance exceeds a predetermined value (i.e., if an amount of change in brightness in the area exceeds a predetermined amount), it can be estimated that a moving object exists. By reducing the fluctuation caused by noise, the accuracy can be improved. The specific functions of the image capturing apparatus (camera) 100 includes a moving object detection function of determining whether a moving object exists in an image, a detection function of detecting an object carried in a specific area, and a detection function of detecting an object carried away from a specific area in the temporal recognition processing.

Second, spatial recognition processing is machine recognition processing, in which a spatial change in luminance is calculated. The spatial recognition processing calculates an amount of spatial change in luminance in a horizontal direction or a vertical direction on a captured image. If an amount of spatial change in luminance exceeds a predetermined value, the boundary thereof can be detected as a point of discontinuity, i.e., an edge (contour). A feature can be calculated based on the shape of the edge. By reducing the fluctuation caused by the movement of an object, the accuracy can be improved. The specific functions of the image capturing apparatus (camera) 100 includes a human body identification function of identifying whether an object is a human body based on the shape of the human shoulder and the shape of the human head and a face recognition function of evaluating a matching degree by comparing a positional relationship between facial regions, such as the eyes, the nose, and the mouth, or shapes of the facial regions with training data in the spatial recognition processing. The training data is pre-stored feature data. Increasing the amount of training data (the number of samples) through machine learning can improve the accuracy.

An imaging condition placed on high priority is different between the temporal recognition processing and the spatial recognition processing. Specifically, the analog gain is prioritized over the exposure time in the temporal recognition processing, and the exposure time is prioritized over the analog gain in the spatial recognition processing.

In the temporal recognition processing, the accuracy is improved by reducing unintentional inter-image changes in luminance (noise) by capturing images at low analog gain (low noise). Although setting to a low analog gain involves setting to a long exposure time, the spatial change in luminance, i.e., motion blur, does not have a substantial effect on the accuracy in the temporal recognition processing, making it possible to make settings with the analog gain placed on high priority.

In the spatial recognition processing, the accuracy is improved by reducing an unintentional change in luminance (motion blur) in a space by capturing an image in a short exposure time (small motion blur). This is because it is difficult for motion blur to be prevented by digital processing. Although setting to a short exposure time involves setting to a high analog gain, digital processing, such as using a differential filter, can reduce the effect of noise caused by the analog gain.

The respective functional blocks indicated by the reference numerals 102b, 102c, and 103 to 108 in FIG. 1A are implemented by software. More specifically, programs for providing the functions of the respective functional blocks in FIG. 1A are stored in a memory, such as a read only memory (ROM) 124 in FIG. 1B. Then, a CPU 123 reads out a program to a random access memory (RAM) 125 in FIG. 1B and runs the program to implement the respective functional blocks. In addition, all or a part of the functional blocks can be implemented by hardware, for example, by generating a dedicated circuit automatically on a field programmable gate array (FPGA) through a program for implementing the functions of the respective functional blocks by using a predetermined compiler. Further, the functional blocks may be implemented as hardware by forming a gate array circuit through a method similar to that of the FPGA. Furthermore, the functional blocks may be implement by an application specific integrated circuit (ASIC).

In addition, the configuration of the functional blocks illustrated in FIG. 1A is merely one example, and a plurality of functional blocks may constitute a single functional block, or any one of the functional blocks may be divided into blocks which perform a plurality of functions.

Figure 1B:
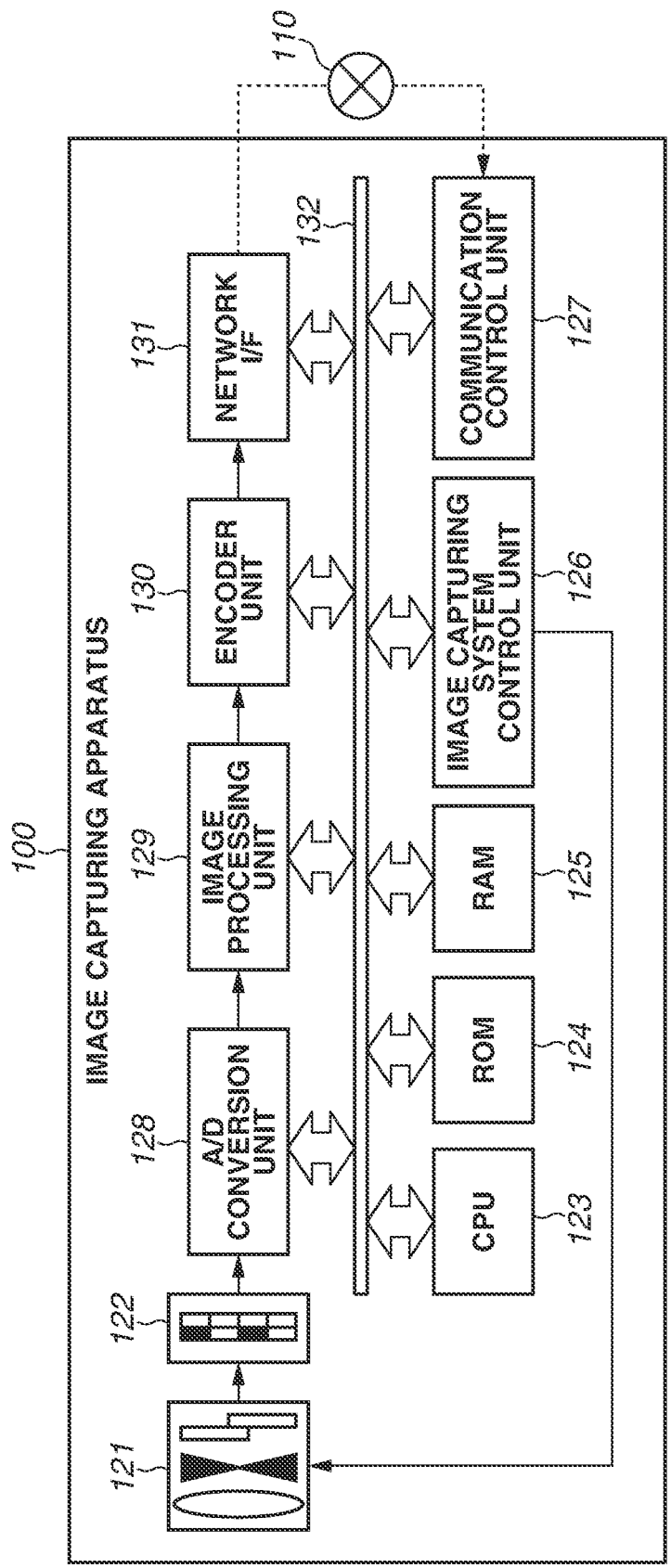
FIG. 1B is a block diagram illustrating an example of a hardware configuration of the image capturing apparatus in FIG. 1A.

FIG. 1B illustrates an example of a hardware configuration of the image capturing apparatus 100.

The image capturing apparatus 100 includes an image capturing optical system 121, an image sensor 122, a CPU 123, a ROM 124, a RAM 125, an image capturing system control unit 126, a communication control unit 127, an A/D conversion unit 128, an image processing unit 129, an encoder unit 130, and a network I/F 131. The respective units 123 to 131 of the image capturing apparatus 100 are connected to each other via a system bus 132. Examples of the ROM 124 include a flash memory. Examples of the RAM 125 include an SRAM and a DRAM. The ROM 124 and the RAM 125 correspond to the memory 109 in FIG. 1A.

The image capturing optical system 121 is a group of optical members including a zoom lens, a focus lens, a camera-shake correction lens, an aperture, and a shutter, all of which condense light information about an object. The image capturing optical system 121 is connected to the image sensor 122. The image capturing optical system 121 corresponds to the image capturing optical system 101 in FIG. 1A.

The image sensor 122 is an electric charge accumulation-type solid-state image sensor, such as a CMOS sensor or a CCD sensor, which converts luminous flux condensed by the image capturing optical system 121 into an electric current value (signal value). The image sensor 122 corresponds to the image sensor 102a in FIG. 1A. The image sensor 122 is connected to the A/D conversion unit 128.

The CPU 123 is a control unit which generally controls the processing performed by the image capturing apparatus 100. The CPU 123 reads a command stored in the ROM 124 or the RAM 125 and performs processing based on the read result. The CPU 123 corresponds to the system control unit 103 in FIG. 1A.

The image capturing system control unit 126 controls respective units of the image capturing apparatus 100 based on instructions from the CPU 123. For example, the image capturing system control unit 126 performs focus control, shutter control, and aperture adjustment on the image capturing optical system 121. The image capturing system control unit 126 corresponds to the system control unit 103 in FIG. 1A.

The communication control unit 127 performs control for transmitting control commands (control signals) for the respective units of the image capturing apparatus 100 to the CPU 123 from the client apparatus 210 by communicating with the client apparatus 210. The communication control unit 127 corresponds to the system control unit 103 in FIG. 1A.

The A/D conversion unit 128 converts the electric current value received from the image sensor 122 to a digital signal (image data). The A/D conversion unit 128 transmits the digital signal to the image processing unit 129. The A/D conversion unit 128 corresponds to the image processing unit 102c in FIG. 1A.

The image processing unit 129 performs image processing on the image data as the digital signal received from the A/D conversion unit 128. The image processing unit 129 is connected to the encoder unit 130. The image processing unit 129 corresponds to the image processing unit 102c in FIG. 1A.

The encoder unit 130 performs processing of converting the image data processed by the image processing unit 129 into image data in a file format, such as motion JPEG, H.264, or H.265. The encoder unit 130 is connected to the network I/F 131. The encoder unit 130 corresponds to the encoder unit 107 in FIG. 1A.

The network I/F 131 is an interface used for communicating with an external apparatus, such as the client apparatus 210, via the network 110, and the network I/F 131 is controlled by the communication control unit 127. The network I/F 131 corresponds to the network I/F 108 in FIG. 1A.

Figure 2:
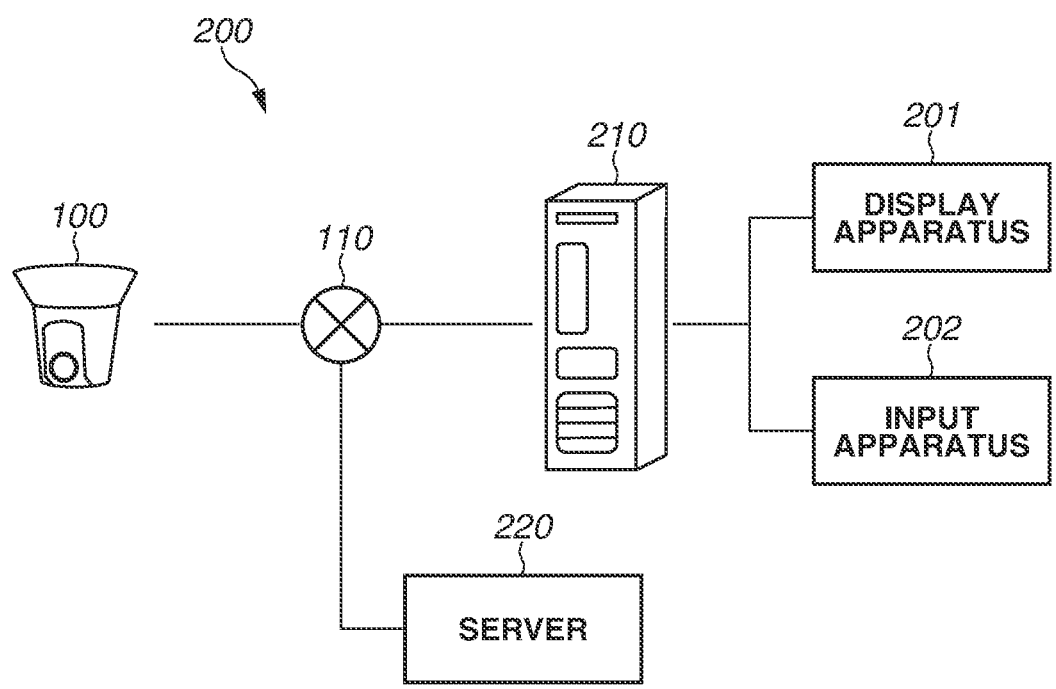
FIG. 2 is a block diagram illustrating an example of a configuration of an image capturing system according to the first exemplary embodiment.

The configuration of an image capturing system 200 including the image capturing apparatus 100 will now be described with reference to FIG. 2. FIG. 2 illustrates an example of a configuration of the image capturing system 200. In the image capturing system 200, the image capturing apparatus 100 is connected via the network 110 to the client apparatus 210 and the server 220. The client apparatus 210 is an information processing apparatus, such as a personal computer.

The client apparatus 210 is connected to a display apparatus 201 and an input apparatus 202 through wired connection or wireless connection. The display apparatus 201 includes a display for displaying images and a user's operation screen (a graphic user interface (GUI)). For example, the display is a liquid crystal display. The input apparatus 202 includes a mouse and a keyboard, and a user can operate the input apparatus 202 while looking at a screen displayed on the display apparatus 201. The GUI may be regarded as a part of the input apparatus 202.

In FIG. 2, while the display apparatus 201 and the input apparatus 202 are arranged outside the client apparatus 210, at least one of the display apparatus 201 or the input apparatus 202 may be built into the client apparatus 210.

Figure 3:
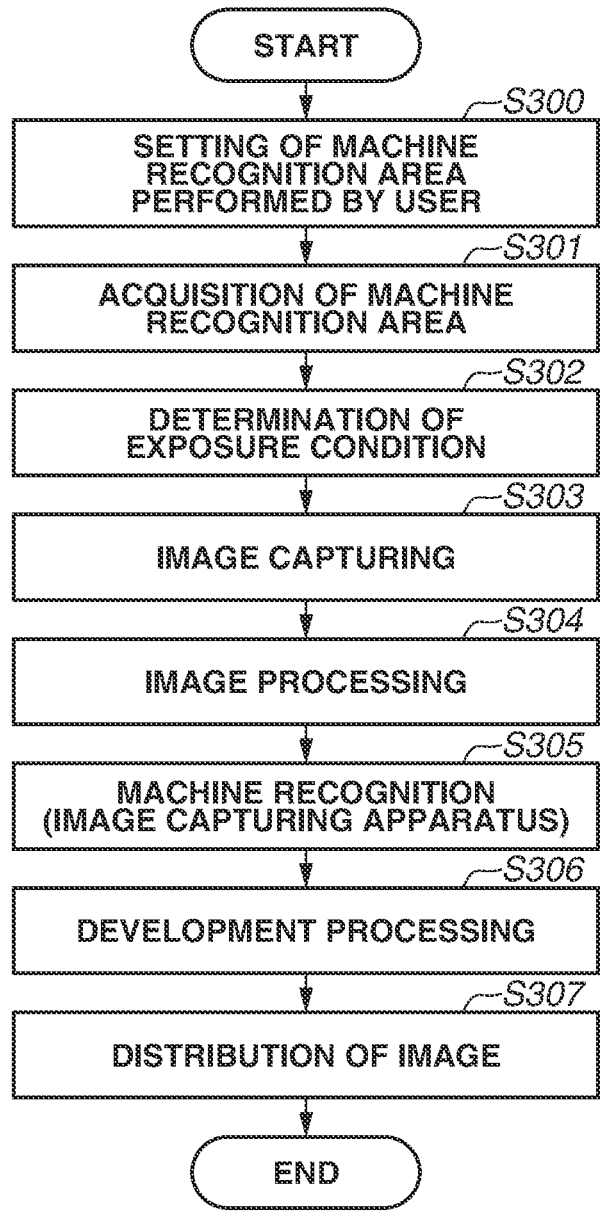
FIG. 3 is a flowchart illustrating an example of processing to be performed by the image capturing apparatus according to the first exemplary embodiment.

Processing to be performed by the image capturing apparatus 100 will now be described with reference to FIG. 3. FIG. 3 is a flowchart illustrating an example of processing to be performed by the image capturing apparatus 100. In FIG. 3, the processing to be performed when a machine recognition area is specified by a user will be described.

In step S300, the user sets (specifies) a machine recognition area. For human body detection, for example, the user specifies a walkway which a person is expected to walk through as a machine recognition area. The user instructs the image capturing apparatus 100 on the machine recognition area (transmits area specification information) from the client apparatus 210 via the network 110. The client apparatus 210 is connected to the display apparatus 201, so that images can be displayed on the display apparatus 201. The display apparatus 201 (display 400 in FIG. 4) functions as a user interface which allows the user to perform operation. The user can thus operate an image captured by the image capturing apparatus 100 and a button or a slide key superimposed thereon via touch/drag operations. The user makes settings for the machine recognition area on the image displayed thereon. The user interface for setting the machine recognition area will be described below with reference to FIG. 4.

In step S301, the image capturing apparatus 100 acquires the machine recognition area (image recognition area). The image capturing apparatus 100 acquires the machine recognition area through the machine recognition area acquisition unit 104 based on the instruction on the machine recognition area acquired via the network 110.

In step S302, the image capturing apparatus 100 controls and determines exposure conditions (the analog gain and the exposure time). In the present exemplary embodiment, the CPU 123 of the image capturing apparatus 100 determines a transition setting of the exposure conditions to be applied to the machine recognition area based on the content of the machine recognition.

In the present exemplary embodiment, unless otherwise specified, the exposure conditions refer to the analog gain and the exposure time. In order to determine the exposure conditions, the image capturing apparatus 100 calculates an average value of luminance for each area. The image capturing apparatus 100 acquires the difference between the average value of luminance and a target luminance, and makes an exposure time or analog gain transition for the difference. In the present exemplary embodiment, priorities assigned to the exposure time and the analog gain for transition are different between the non-machine recognition area and the machine recognition area. The exposure conditions are independently determined (set) for each pixel block (one pixel or more pixels). Further, exposure conditions set for the non-machine recognition area and the machine recognition area are different in the ratio between the analog gain and the exposure time even with the same luminance. Details of a transition setting of AE will be described with reference to transition charts of exposure conditions illustrated in FIGS. 5, 6, and 7.

In step S303, image capturing is performed under the determined exposure conditions. More specifically, the system control unit 103 of the image capturing apparatus 100 causes the image sensor 102a to perform image capturing.

In step S304, the image capturing apparatus 100 performs image processing on an image signal (image data) acquired through the image capturing, and acquires luminance information. Luminance information refers to a luminance value of each pixel or each pixel block, an amount of temporal change in luminance, and an amount of spatial change in luminance. To calculate an amount of temporal change in luminance, the image capturing apparatus 100 saves a luminance of an image signal captured one frame or more before a current frame into a memory, and compares a luminance of the current frame with the saved luminance.

In step S305, based on the luminance information acquired in step S304, the image processing unit 102c performs machine recognition processing.

In step S306, the image processing unit 102c performs development processing. Through this processing, the image data is compressed to an image in a JPEG format.

In step S307, the compressed image is distributed (transmitted) to the client apparatus 210 through the network I/F 108.

The client apparatus 210 receives the compressed image. Then, the client apparatus 210 displays the received image on the display apparatus 201.

Figure 4:
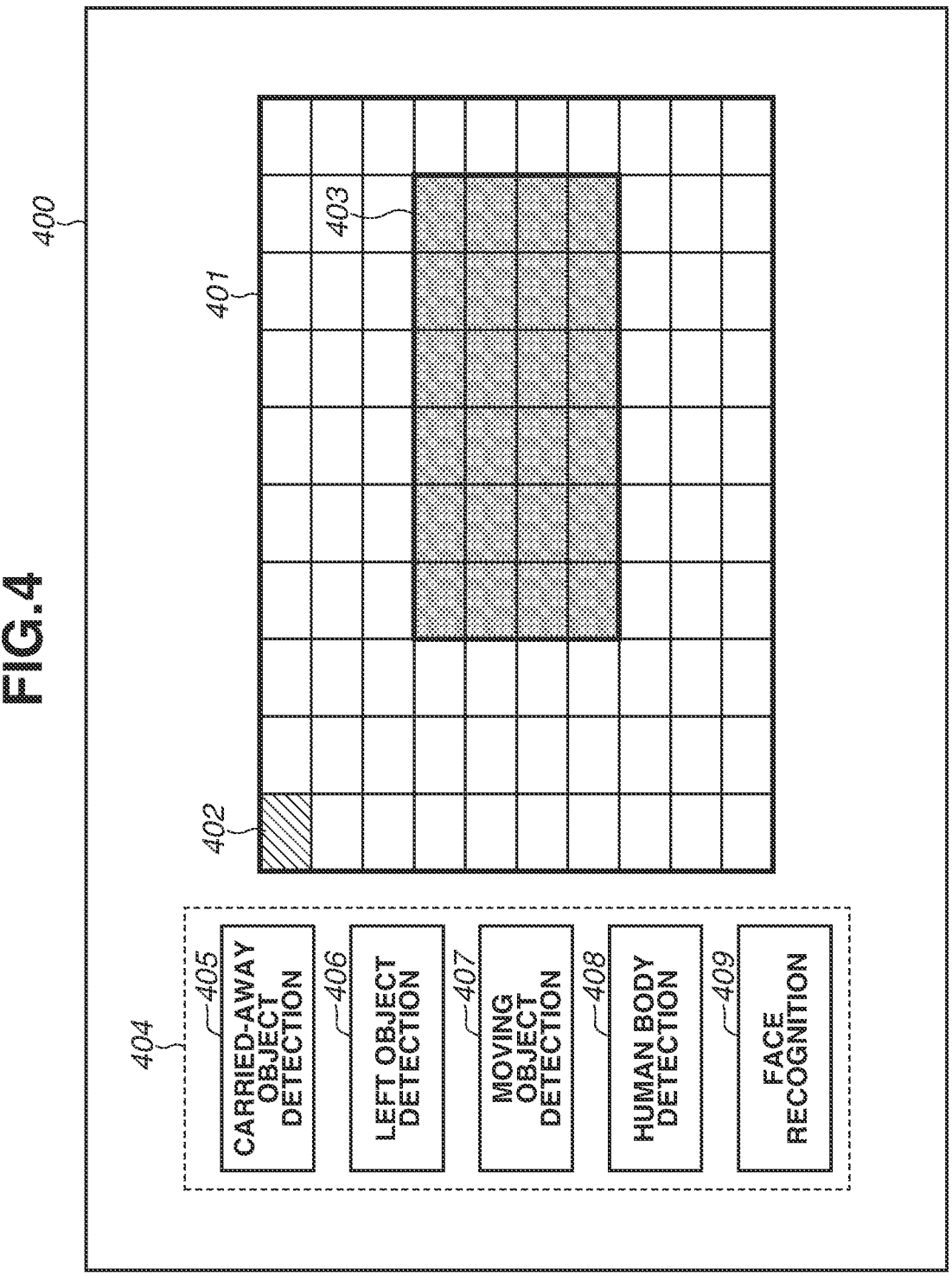
FIG. 4 illustrates an example of a screen to be operated by a user, according to the first exemplary embodiment.

A setting method for a machine recognition area performed by the user will now be described with reference to FIG. 4. FIG. 4 illustrates an example of an operation screen operated by the user. Examples of a distributed image 401 and a function selection portion 404 are displayed on a display 400 serving as an operation screen. A grid within the distributed image 401 represents boundaries between exposure blocks of the image sensor 102a. An exposure block 402 on the upper left of the distributed image 401 is drawn as a shaded area. The user can select an area to perform machine recognition.

A user-specified area 403 is a machine recognition area specified by the user. In FIG. 4, the user-specified area 403 is depicted as a dotted area. The user can specify the user-specified area 403 by performing dragging or clicking on an area in the image with a mouse.

The function selection portion 404 is a user interface for selecting functions of the machine recognition. For example, the buttons of a carried-away object detection 405, a left object detection 406, a moving object detection 407, a human body detection 408 and a face recognition 409 are illustrated in FIG. 4. The user can determine the content of machine recognition (image recognition) using the function selection portion 404.

The carried-away object detection is a function of determining whether a stationary object within a specified area is moved, and detection is performed based on a temporal change in luminance or an edge. The left object detection is a function of determining whether a stationary object within a specified area is not moved, and detection is performed based on a temporal change in luminance or an edge. In the carried-away object detection and the left object detection, determination is made based on information about an edge or luminance of the stationary object. Motion blur thus does not affect the detection accuracy. The exposure time can therefore be set longer, so that an image with low noise can be acquired with a lower analog gain set, improving the detection accuracy. Further, for example, there is a moving object detection method for performing calculation (detects) based on a temporal change in luminance. In this method, determination is made based on whether or not there is an occurrence of a temporal change (movement) in luminance. Motion blur thus has no effect on the detection accuracy. The exposure time can therefore be set longer, so that an image with low noise can be acquired with a lower analog gain set, improving the detection accuracy.

In human body detection, edges regarded as features of a human body (e.g., the head and the shoulder) are detected on one image, and similarity is calculated as an evaluation value by comparing the features with training data. If the features are similar to the training data, the evaluation value becomes high. Otherwise, the evaluation value becomes low. In order to detect edges on one image, it is important for no motion blur to be found. Thus, setting the exposure time shorter improves the detection accuracy of the edges.

Similar to human body detection, in face recognition, edges regarded as features of a human body (e.g., the eyes and the nose) are detected on one image, and similarity is calculated as an evaluation value by comparing the features with training data. If the features are similar to the training data, the evaluation value becomes high. Otherwise, the evaluation value becomes low. In order to detect edges of one image, it is important for no motion blur to be found. Thus, setting the exposure time shorter improves the detection accuracy of the edges.

A transition setting of AE depending on the setting of a machine recognition area will now be described with reference to FIGS. 5, 6, and 7. In the present exemplary embodiment, a transition chart to be applied to a non-machine recognition area is called "balanced AE transition chart (FIG. 5)", a transition chart to be applied to a temporal machine recognition area is called "analog gain prioritized AE transition chart (FIG. 6)", and a transition chart to be applied to a spatial machine recognition area is called "exposure time prioritized AE transition chart (FIG. 7)".

Figure 5:
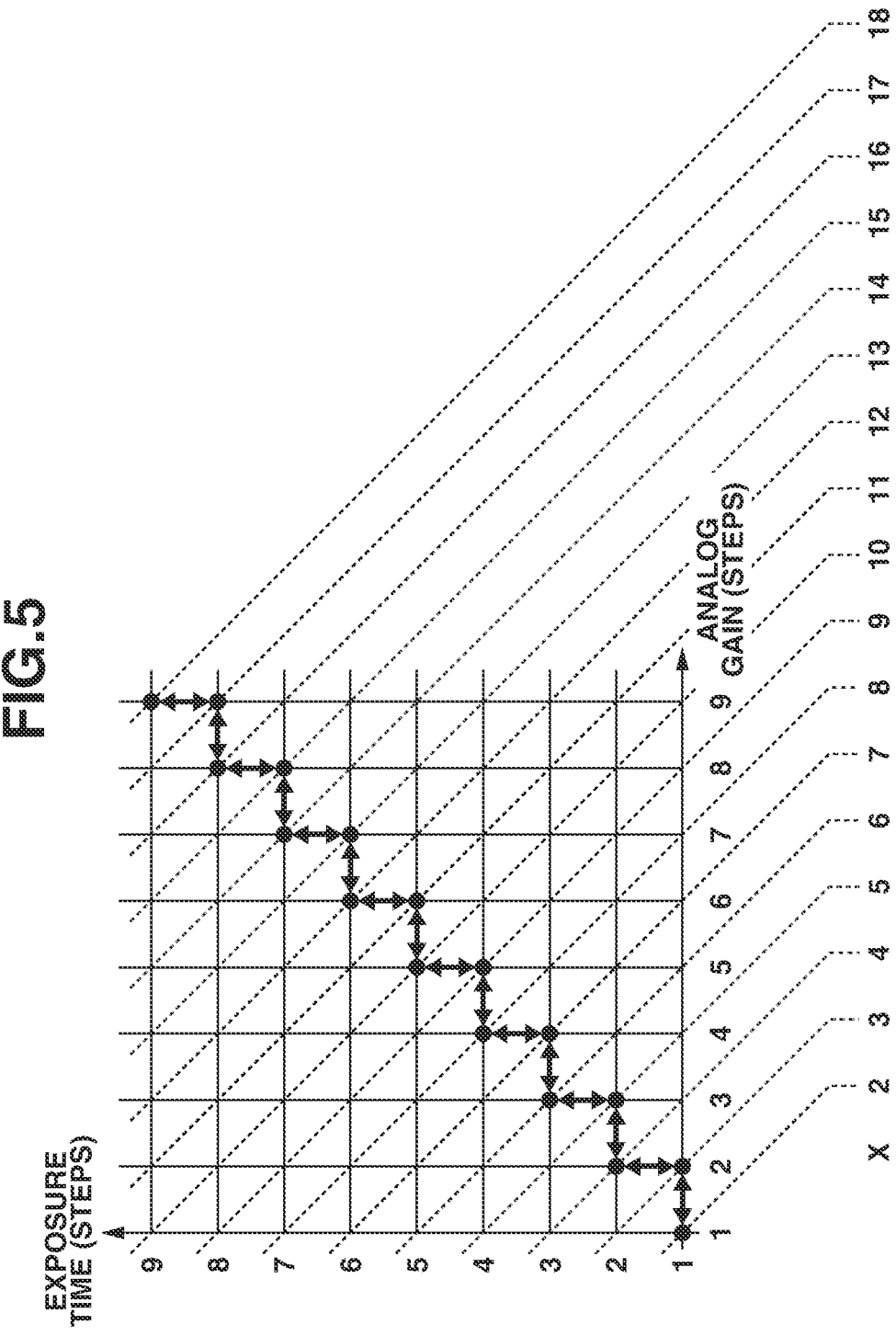
FIG. 5 illustrates an example of an auto-exposure (AE) transition setting to be applied to a non-machine recognition area.
Figure 6:
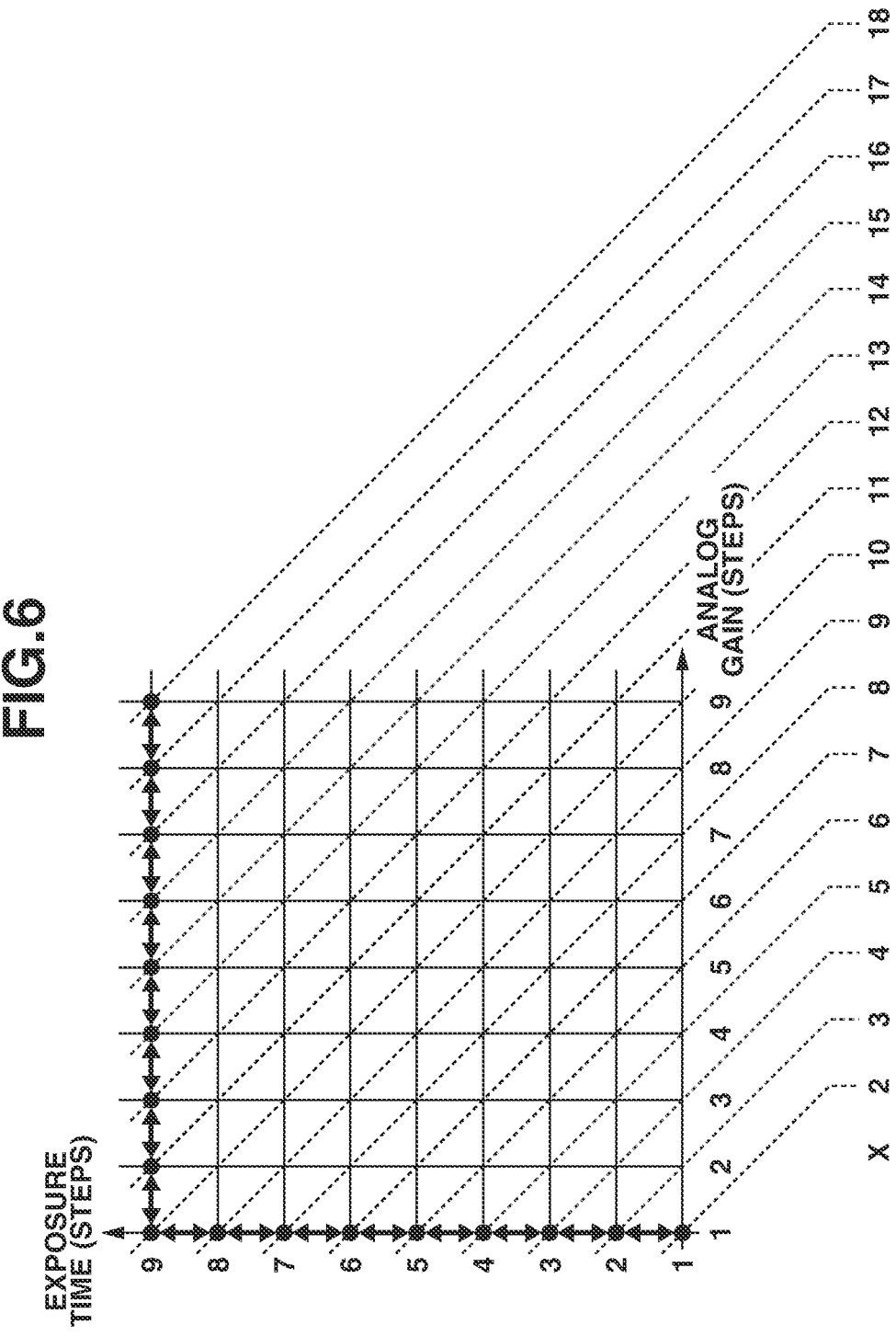
FIG. 6 illustrates an example of an AE transition setting to be applied to a machine recognition area where temporal recognition processing is to be performed.
Figure 7:
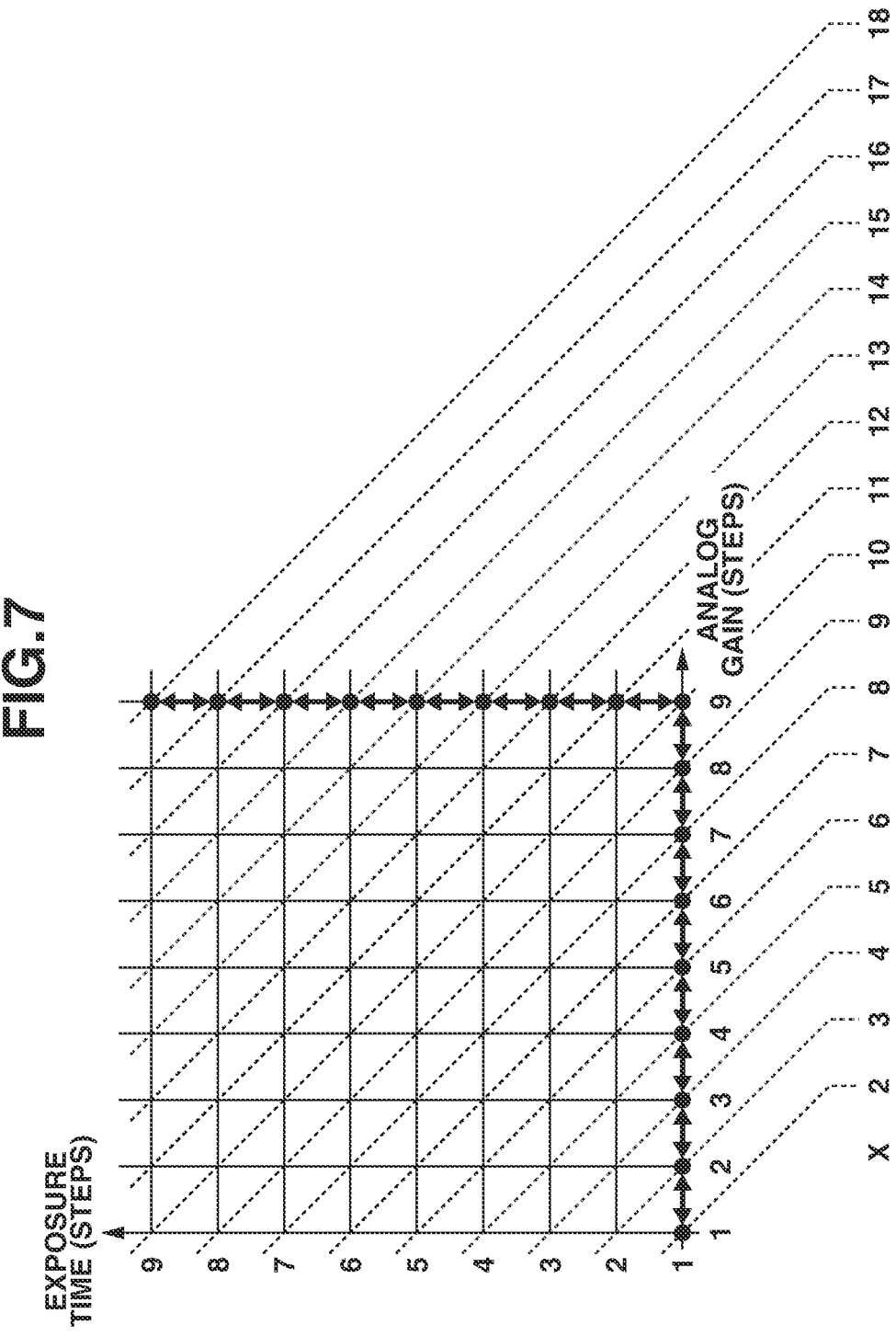
FIG. 7 illustrates an example of an AE transition setting to be applied to a machine recognition area where spatial recognition processing is to be performed.

In each of FIGS. 5 to 7, the horizontal axis represents analog gains, and the vertical axis represents exposure times. Further, numerals described in the horizontal axis and the vertical axis refer to the number of steps, and the exposure amount is doubled when a numeral is incremented by one step. The sum of the number of steps of analog gain and the number of steps of exposure time is expressed as the number of steps of exposure value (EV) (exposure). A relationship between exposure (EV), analog gain, and exposure time is expressed by a formula 1. Further, the value determined by an analog gain and an exposure time is expressed as an exposure amount X by a formula 2. EV=0, regarded as the reference of EV, is brightness in which an object is exposed appropriately when the object is captured under the conditions that the International Organization for Standardization (ISO) sensitivity (analog gain) is 100, the exposure time is 1 sec., and the aperture value is f/1. In the present exemplary embodiment, while a description about the aperture is omitted, the exposure value EV and the exposure amount X are treated as relative values which indicate changes in exposure when the analog gain or the exposure time is changed.

Exposure EV (the number of steps)=-(Analog Gain (the number of steps)+Exposure Time (the number of steps))      Formula 1

Exposure Amount X(the number of steps)=-EV(the number of steps)=Analog Gain(the number of steps)+Exposure Time(the number of steps)      Formula 2

In other words, under the exposure conditions at the lower left corner of the transition chart (the intersection point of the vertical axis and the horizontal axis), X is 2 (X=2), i.e., the sum of one step of analog gain and one step of exposure time. Under the exposure condition at the upper right corner of the transition chart, for example, X is 18 (X=18), i.e., the sum of nine steps of analog gain and nine steps of exposure time. A value of X results in a common exposure amount, regardless of difference between the exposure time and the analog gain. The arrows illustrated in FIGS. 5 to 7 indicate transition directions of exposure condition. In order to change a value of X, the analog gain or the exposure time is transitioned in the direction indicated by an arrow. In the present exemplary embodiment, for the sake of simplicity, a value is transitioned by one step each time. However, a value that can be transitioned at a time is not limited to one step.

The balanced AE transition chart in FIG. 5 illustrates a balanced transition between the exposure time and the analog gain to provide a high visible image for a user. For example, in order to transition from X=2 to X=6, a transition of four steps is performed in total (i.e., two steps of analog gain and two steps of exposure time) by alternately making the analog gain and the exposure time transition by one step each time. This allows image whose noise and motion blur are balanced to be obtained.

In contrast to the balanced AE transition chart in FIG. 5, the analog gain prioritized AE transition chart (FIG. 6) to be applied to a temporal machine recognition area and the exposure time prioritized AE transition chart (FIG. 7) to be applied to a spatial machine recognition area are different from each other in terms of the priorities assigned to the analog gain and the exposure time. The analog gain prioritized AE transition chart and the exposure time prioritized AE transition chart will be described.

In the analog gain prioritized AE transition chart in FIG. 6 to be applied to a temporal machine recognition area, the analog gain is prioritized and fixed to low gain (in FIG. 6, a minimum step, i.e., one step) when X is a small numeral (in FIG. 6, when X is ten steps or less), and the adjustment of exposure is performed with the exposure time. This allows images with low-noise to be obtained. Thus, the amount of temporal change in luminance is not buried in the noise, improving the detection accuracy. However, in the area where X is a large numeral (in FIG. 6, when X is eleven or more), a value of X cannot be increased any more with the exposure time alone. The adjustment of exposure is performed with the analog gain.

In addition, in FIG. 6, while the analog gain is changed after the exposure time becomes its maximum value, the analog gain can be changed before the exposure time becomes its maximum value. The analog gain may be controlled (changed) gradually. For example, the analog gain is fixed to one until X becomes six (X=6) and fixed to two until X becomes eight (X=8). However, the priority of the analog gain is set higher than that of the balanced AE transition chart in FIG. 5.

In the analog gain prioritized AE transition chart (exposure time prioritized AE transition chart) in FIG. 7 to be applied to a spatial machine recognition area, the exposure time is prioritized and fixed to a short period (in FIG. 7, a minimum step, i.e., 1 step) when X is a small numeral (in FIG. 7, when X is ten steps or less), and the adjustment of exposure is performed with the analog gain. This allows images with small motion blur to be acquired. As a result, the amount of spatial change in luminance is not buried in the motion blur, improving the detection accuracy. However, in the area where X is a large numeral (in FIG. 7, when X is eleven or more), a value of X cannot be increased with the analog gain alone. The adjustment of exposure is performed with the exposure time.

In addition, in FIG. 7, while the exposure time is changed after the analog gain becomes its maximum value, the exposure time can be changed before the analog gain becomes its maximum value. The exposure time may be controlled (changed) gradually. For example, the exposure time is fixed to 1 until X becomes six (X=6) and fixed to two until X becomes eight (X=8). However, the priority of the exposure time is set higher than that of the balanced AE transition chart in FIG. 5 to be applied to a non-machine recognition area.

In the present exemplary embodiment, the image capturing apparatus 100 determines whether to apply a transition setting of FIG. 6 or a transition setting of FIG. 7 to a machine recognition area about exposure conditions based on the type (content) of machine recognition. A transition setting in FIG. 5 is applied to a non-machine recognition area (an area other than the image recognition area), so that the exposure conditions provide a high visibility for a user (human).

As described above, according to the present exemplary embodiment, setting a transition setting of AE with a priority (a transition setting in FIG. 6 or a transition setting in FIG. 7) different from that for an area specified as a machine recognition area improves the detection accuracy of machine recognition, while an image with high visibility in a non-machine recognition area is output. Further, selecting or determining which to be prioritized, the analog gain or the exposure time, depending on a recognition processing method for machine recognition (content of machine recognition) allows a setting suited to the type of machine recognition to be set, improving the detection accuracy.

While transition settings of AE to be applied to an machine recognition area described with reference to FIGS. 6 and 7 has been described, modifying (changing or adjusting) a transition setting depending on the accuracy required for machine recognition (required accuracy) provides a high visibility with a fixed accuracy for machine recognition. For example, the accuracy is different between when face recognition (spatial recognition processing) is performed in Case 1, where determination is made as to whether an object is a human face, and in Case 2, where determination is made as to the age of a human face. It is suitable that a determination in Case 2 is made with a higher detection accuracy, because more detailed data is used in determination in Case 2.

Thus, as illustrated in FIG. 7, in Case 2, where determination is made as to age of a human face, motion blur of the object is reduced by performing image capturing with the exposure time set to one from X=2 to X=10. On the other hand, in Case 1, where determination is made as to whether an object is a human face, determination can be made not as accurately as (or as highly accurately as) in Case 2, where the determination is made as to age of a human face. Thus, a transition of AE which places an importance on visibility is performed in brightness enough for sufficient detection accuracy, and a transition of AE which places an importance on machine recognition is performed in brightness not enough for sufficient detection accuracy. The above-described processing will be described specifically based on the assumption that the range from X=1 to X=6 provides brightness enough for sufficient detection accuracy.

In the range from X=1 to X=6 for brightness enough for sufficient detection accuracy, the visibility is improved by causing AE to transition as in the balanced AE transition chart in FIG. 5. In the range from X=7 to X=12 for brightness not enough for sufficient detection accuracy, the detection accuracy is improved by fixing the exposure time to 3. Although the number of steps to fix the exposure time is different from in FIG. 7, the exposure time is prioritized (fixed) as illustrated in FIG. 7. With more than X=12, the adjustment with the analog gain cannot be made, so that the adjustment of exposure is performed with the exposure time. As described above, changing the priority for different accuracies improves the visibility with a fixed sufficient detection accuracy. Further, a transition setting of AE can similarly be modified (changed or adjusted) depending on the type of machine recognition, regardless of different accuracies for machine recognition.

There is also a case where a machine recognition area is set in a non-machine recognition area. For example, if a moving object is detected (recognized) in a non-machine recognition area, a machine recognition area is newly set therein. In this case, it is desirable that the exposure time and the analog gain be transitioned regardless of the value of X, so that AE may be set in an AE transition chart for the changed area (machine recognition area). In this case, AE may be transitioned at once in one frame, or may gradually be transitioned by several steps each time. If AE is transitioned at once, the type of area is changed with reference to the AE setting of X as a target in the AE transition chart. If AE is transitioned gradually by several steps each time, it is desirable that the prioritized item from between the analog gain and the exposure time be transitioned first. This processing allows the detection accuracy to be improved in a short time. As described above, if the type of area (a non-machine recognition area, a temporal machine recognition area, or a spatial machine recognition area) is to be changed, the exposure time and the analog gain are transitioned with reference to an AE transition chart of the changed area.

In the present exemplary embodiment, a value of exposure amount X (=−EV) is expressed as the sum of the exposure time and the analog gain. However, there can be a case where the quantity of light incident on the image sensor 102a is changed through an aperture or a neutral density (ND) filter at the image capturing optical system 101. Thus, it is desirable that the exposure time or the analog gain be transitioned with a corrected value of X (=−EV) based on luminance information and optical information about the image capturing optical system 101.

In the above-described exemplary embodiment, the analog gain and the exposure time of the AE transition charts are changed (transitioned) by one step each time. However, transition does not have to be performed by one step each time. For example, a transition may be made by one-third steps or two steps each time.

Whether to make a setting of a machine recognition area where a transition setting of AE is to be changed can be changed by a designer or a user depending on the type of machine recognition, the location of the area, or the image capturing condition. For example, for a higher accuracy of face recognition alone from among a plurality of types and contents of machine recognition (e.g., five image recognition functions 405 to 409 included in the function selection portion 404 in FIG. 4), a transition setting of AE to be applied to a machine recognition area may be changed with respect to only an area subject to face recognition. Further, the change of a transition setting of AE does not have to be applied to all of the areas subject to machine recognition. For example, even if moving object detection and human body identification are simultaneously performed in different areas, a transition setting of AE may be changed with respect to one of the areas. At this time, it is desirable that the designer or the user set or select (determine) a machine recognition area depending on the type (content) of the machine recognition. This can improve the accuracy of the machine recognition on which the designer or the user places an importance.

Further, if different types of machine recognition are performed on an area, such as human identification (human body detection) is performed thereon after moving object detection, a transition setting of AE may be changed each time each machine recognition is performed. A method will be described specifically for changing a transition setting of AE when human body detection (human detection) is to be performed after moving object detection.

In moving object detection (temporal recognition processing), it is desirable that noise be reduced in order to prevent false detection (FIG. 6). On the other hand, in human body detection (spatial recognition processing) to be performed after moving object detection, it is desirable that the exposure time be shortened in order to accurately calculate features of a human body or a face (FIG. 7). Thus, the analog gain prioritized AE transition chart in FIG. 6 is applied during the moving object detection, and the exposure time prioritized transition chart in FIG. 7 is applied during the human identification. This allows a plurality of transition settings of SE to be applied to an area although applied at different timings. In other words, even if different types of machine recognition are set to an area, the accuracy of machine recognition can be improved.

A second exemplary embodiment will be described. In the first exemplary embodiment, the case has been described where a machine recognition area is specified by a user (step S300 in FIG. 3). In the present exemplary embodiment, a case will be described where a machine recognition area is automatically specified (set) by the image capturing apparatus 100. In the present exemplary embodiment, face recognition is taken as a specific example. In order to perform face recognition, first, the image capturing apparatus 100 performs moving object detection. If a moving object is detected, the image capturing apparatus 100 sets a machine recognition area for the moving object (area) and performs face recognition. Like numbers refer to like elements and pieces of processing similar to those in the first exemplary embodiment, and a redundant detailed description thereof will be omitted.

Figure 8:
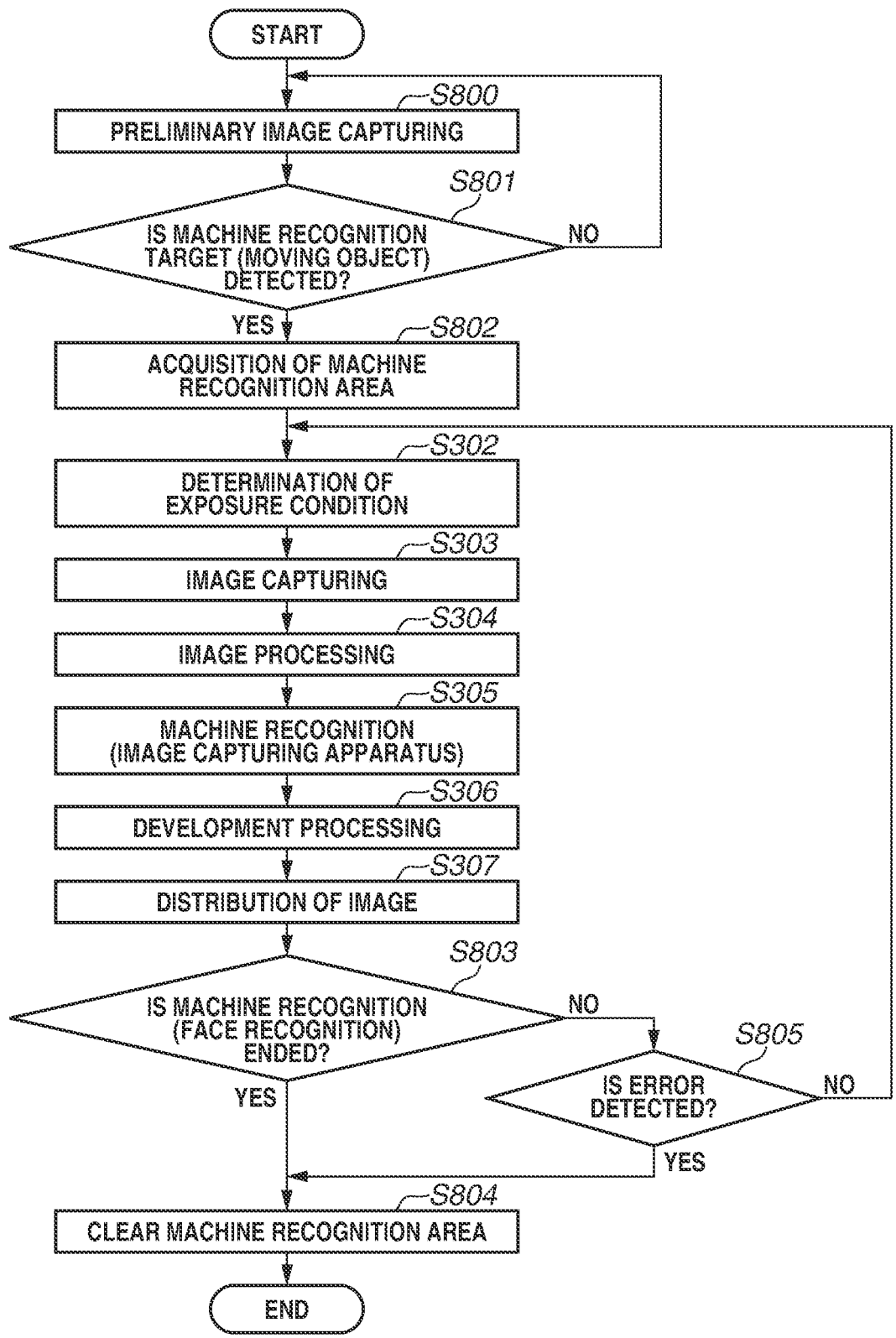
FIG. 8 is a flowchart illustrating an example of processing to be performed by an image capturing system according to a second exemplary embodiment.

The present exemplary embodiment of the present disclosure will be described with reference to FIG. 8. FIG. 8 is a flowchart illustrating a procedure for performing the processing according to the present exemplary embodiment.

In step S800, the image capturing apparatus 100 performs preliminary image capturing. Through the preliminary image capturing, the imaging luminance of the image capturing apparatus 100 is acquired.

In step S801, based on the luminance acquired in the preliminary image capturing, it is determined whether a temporal change in luminance is a predetermined amount or more. More specifically, based on a temporal change in luminance, it is determine whether a moving object (machine recognition target) is detected. In step S801, in order to detect a moving object, temporal recognition processing is performed. If the temporal change in luminance is the predetermined amount or more, it is determined that a moving object exists in the area. At this time, the moving object detection is performed on the whole area of the image. Thus, it is desirable that the AE transition chart for the temporal recognition processing (FIG. 6) be set for a transition setting of AE during a preliminary image capturing period. However, if an image is visually recognized by the user, the balanced AE transition chart (FIG. 5) may be set.

In step S801, if no moving object is detected (NO in step S801), the processing returns to step S800, and the preliminary image capturing is performed repeatedly.

If a moving object is detected (YES in step S801), the processing proceeds to step S802.

In step S802, the area where the moving object is detected is set as a machine recognition area for performing face recognition (spatial recognition processing). At this time, the setting is made taking into account a detection error and the movement of the moving object. Specifically, it is desirable that a large area which includes the periphery of the actual detected area be set as a machine recognition area subject to the spatial recognition processing. After the processing in step S802, the processing proceeds to step S302.

The processing in steps S302 to S307 is similar to the processing in steps S302 to S307 illustrated in FIG. 3, so that the description thereof will be omitted. After the processing in step S307, the processing proceeds to step S803.

In step S803, it is determined whether face recognition (machine recognition) is completed. For example, if an evaluation value of the face recognition is a predetermined value or more (if the evaluation value is a score of 80/100 or more), it is determined that the face recognition is completed. If the face recognition is completed (YES in step S803), the processing proceeds to step S804. In step S804, the setting of the machine recognition area is cleared, and the processing in FIG. 8 is ended. In step S803, if the evaluation value is less than a score of 80/100 (NO in step S803), the processing proceeds to step S805.

In step S805, error determination of the face recognition is performed (whether an error is detected). For example, the number of images whose evaluation values are less than a score of 80/100 is counted to determine whether the image count reaches a predetermined number (e.g., 10). In step S805, a determination result is "NO" until the count of images whose evaluation values are less than a score of 80/100 becomes 10. The processing proceeds to step S302, and the processing in steps S302 to S803 is performed repeatedly. If the evaluation value is not a score of 80/100 or more even though the count of images whose evaluation values are less than a score of 80/100 becomes 10, it is determined that an error is detected (YES in step S805). After the detection of an error is determined, the processing proceeds to step S804. The setting of the machine recognition area is cleared, the count of images is reset, and the processing in FIG. 8 is ended.

In addition, after the processing in step S804, the setting is brought back to the transition setting of AE in the preliminary image capturing (not illustrated in FIG. 8).

An AE transition setting method when a machine recognition area is set automatically according to the present exemplary embodiment has been described. As described above, according to the present exemplary embodiment, setting a transition setting of AE with a different priority to an area specified as a machine recognition area improves the detection accuracy of machine recognition while an image with high visibility in a non-machine recognition area is output. Further, determining which to be prioritized, the analog gain or the exposure time, depending on a recognition processing method for machine recognition allows a setting suited to the type of machine recognition to be set, improving the detection accuracy.

Further, a setting of the machine recognition area can be changed based on a recognition (detection) result obtained by the machine recognition.

A third exemplary embodiment will be described. In the first and the second exemplary embodiments, the cases where machine recognition is performed by the image capturing apparatus 100. In the present exemplary embodiment, a case where machine recognition is performed by the client apparatus 210 will be described. To perform machine recognition, such as face recognition, a plurality of features are calculated and the calculated features are compared with an enormous amount of training data, which calls for a high calculation capability. If the client apparatus 210 has a higher calculation capability than that of the image capturing apparatus 100, it is desirable that machine recognition be performed by the client apparatus 210. Like numbers refer to like elements and pieces of processing similar to those described in the first and the second exemplary embodiments, and a redundant detailed description thereof will be omitted.

Figure 9A:
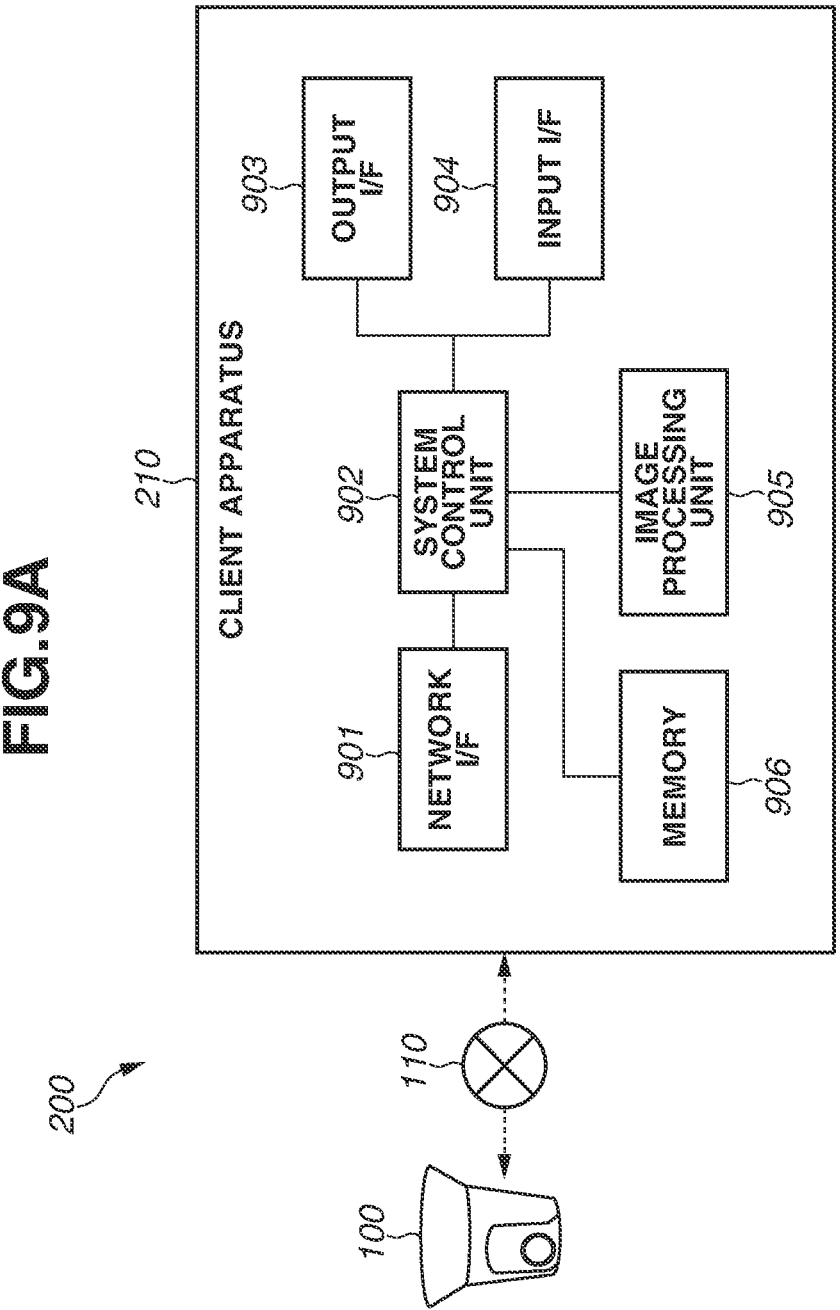
FIG. 9A is a block diagram illustrating a configuration example of a client apparatus according to a third exemplary embodiment.

The present exemplary embodiment of the present disclosure will be described with reference to FIGS. 9A to 11. FIG. 9A illustrates a functional configuration of the client apparatus 210. The client apparatus 210 includes a network I/F 901, a system control unit 902, an output I/F 903, an input I/F 904, an image processing unit 905, and a memory 906.

The network I/F 901 is an interface which connects the client apparatus 210 to a network 110 and performs data input/data output. The system control unit 902 controls the respective modules. The output I/F 903 is an interface between the client apparatus 210 and the display apparatus 201. The input I/F 904 is an interface with the input apparatus 202. The memory 906 stores images and luminance information received from the image capturing apparatus 100. The memory 906 further stores training data used for face recognition and programs to be used by the system control unit 902.

The image processing unit 905 performs machine recognition based on an image or luminance information output from the image capturing apparatus 100. If machine recognition is performed based on the luminance information before compression, it is possible to achieve the accuracy equivalent to the accuracy in machine recognition performed by the image capturing apparatus 100. On the other hand, if machine recognition is performed based on an image after compression, the resolution is degraded due to compressed data, degrading the detection accuracy (recognition accuracy) as compared with a case where machine recognition is performed by the image capturing apparatus 100. Further, compression processing parameters can be changed for each frame, causing a temporal change in the compressed image even with no change in the object. Thus, to perform temporal recognition processing, it is desirable that machine recognition processing parameters be set for change in brightness of an image in consideration of change caused by compression. For example, if determination of moving object detection is performed based on a temporal change in brightness of an image, this determination is performed based on whether the brightness is a value greater than a predetermined reference value. In this case, it is desirable that the predetermined value be mitigated when the compression rate is changed or high, to prevent error detection.

Figure 9B:
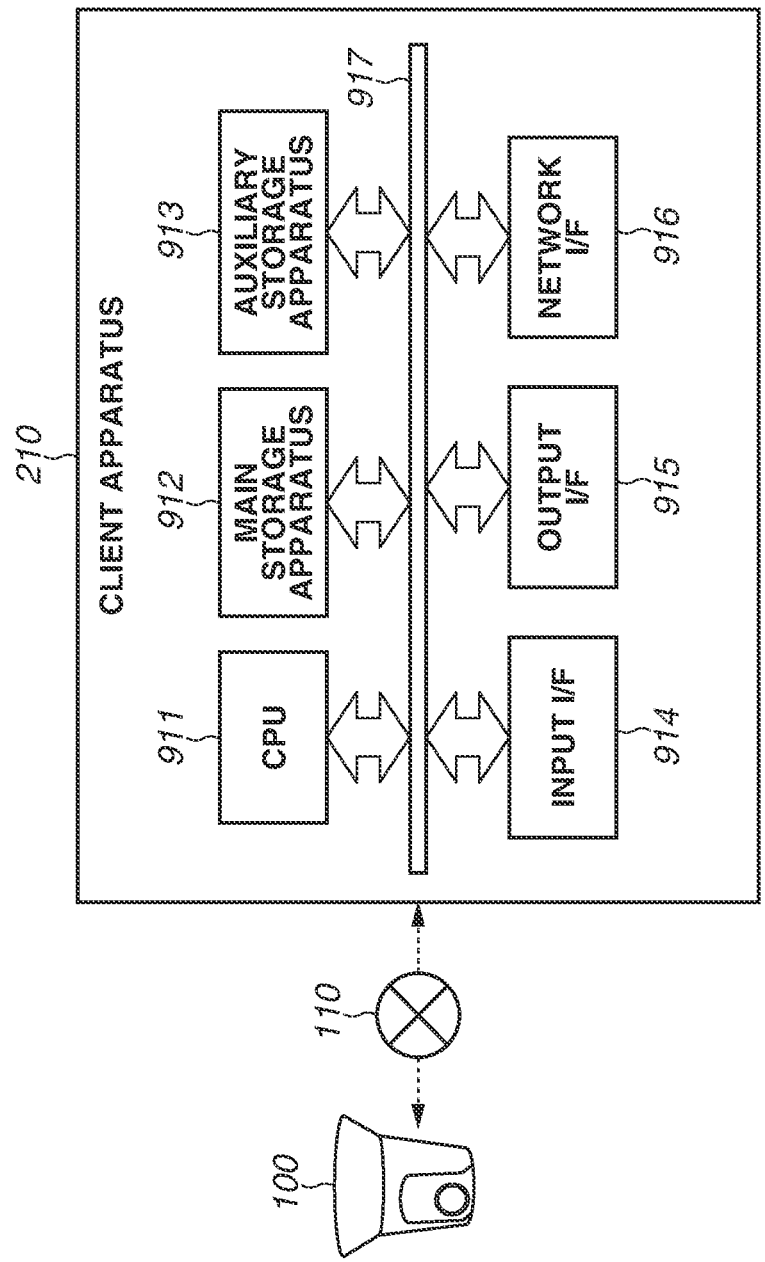
FIG. 9B is a block diagram illustrating an example of a hardware configuration of the client apparatus in FIG. 9A.

FIG. 9B is a block diagram illustrating an example of a hardware configuration of the client apparatus 210.

The client apparatus 210 includes a client CPU 911, a main storage apparatus 912, an auxiliary storage apparatus 913, an input I/F 914, an output I/F 915, and a network I/F 916. The respective constituent elements of the client apparatus 210 are communicably connected to each other via a system bus 917.

The client CPU 911 is a central processing unit which generally controls processing of the client apparatus 210. In addition, the general control of the image capturing apparatus 100 may be performed by the client CPU 911 via the network 110. The client CPU 911 corresponds to the system control unit 902 and the image processing unit 905 in FIG. 9A.

The main storage apparatus 912 is a storage apparatus, such as a RAM, which functions as a temporary data storage area of the client CPU 911. For example, the main storage apparatus 912 previously stores patterns for pattern matching (patterns corresponding to feature parts of a face and a human body) used when the client apparatus 210 performs face detection or human body detection. The main storage apparatus 912 corresponds to the memory 906 in FIG. 9A.

The auxiliary storage apparatus 913 is a storage apparatus, such as a hard disk drive (HDD), a ROM, or a solid state drive (SSD), which stores various programs and various types of setting data. Further, the auxiliary storage apparatus 913 may store a database (face recognition database) in which pre-registered face images are associated with respective pieces of pre-registered personal information. The auxiliary storage apparatus 913 also corresponds to the memory 906 in FIG. 9A.

The input I/F 914 is an interface used when the client apparatus 210 receives inputs (signals) from the input apparatus 202. The input I/F 914 corresponds to the input I/F 904 in FIG. 9A.

The output I/F 915 is an interface used when the client apparatus 210 outputs information (signals) to the display apparatus 201. The output I/F 915 corresponds to the output I/F 903 in FIG. 9A.

The network I/F 916 is an interface used when the client apparatus 210 communicates with an external apparatus, such as the image capturing apparatus 100, via the network 110. The network I/F 916 corresponds to the network I/F 901 in FIG. 9A.

The client CPU 911 performs processing based on the programs stored in the auxiliary storage apparatus 913, so that the processing of the client apparatus 210 (processing in step S1000 in FIG. 10 and processing in step S1100 in FIG. 11) is implemented.

Figure 11:
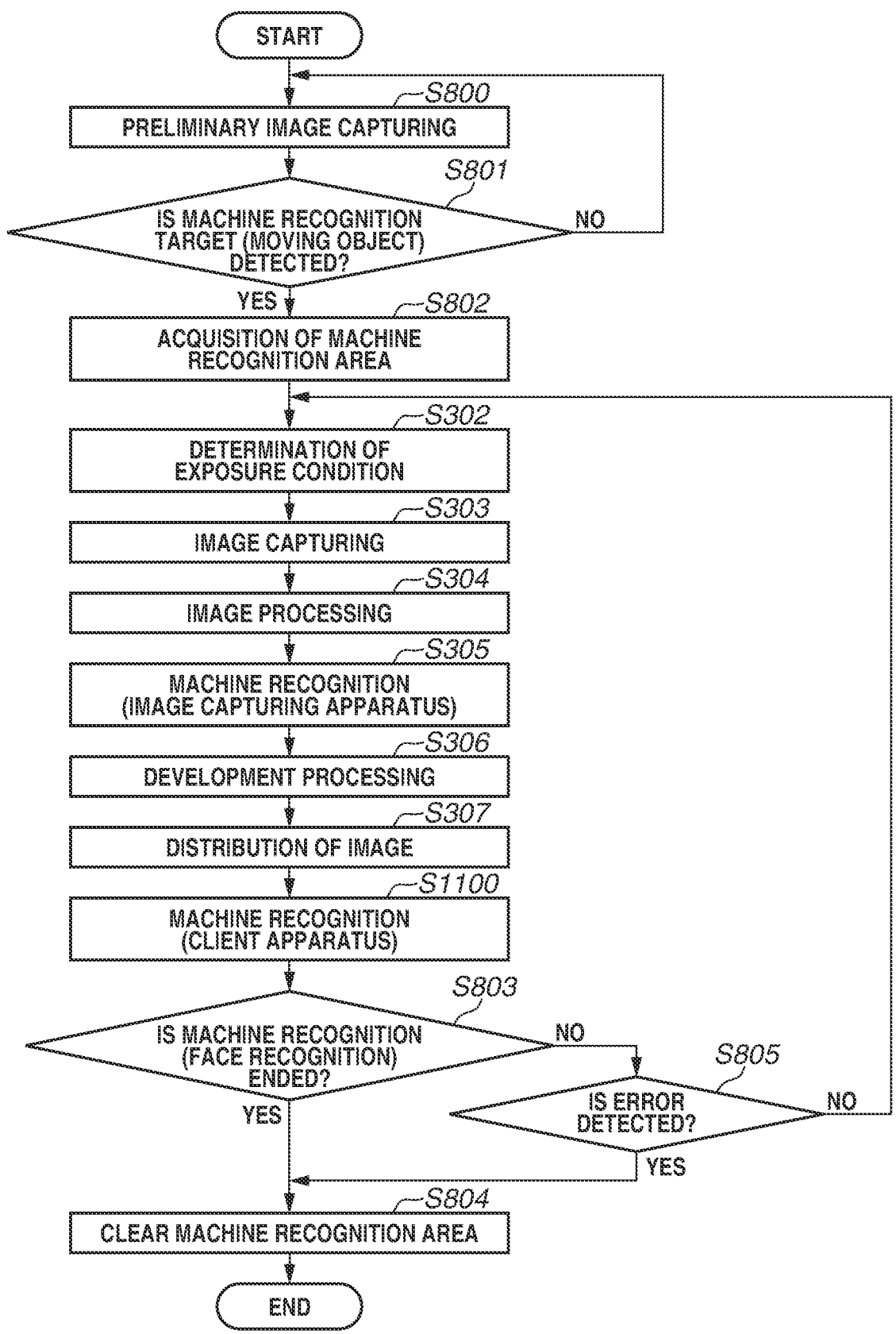
FIG. 11 is a flowchart illustrating another example of processing to be performed by the image capturing system according to the third exemplary embodiment.

The processing to be performed by the client apparatus 210 will now be described with reference to FIGS. 10 and 11. FIG. 10 illustrates an example of an operation procedure of machine recognition processing to be performed by the client apparatus 210 when a machine recognition area is specified by the user as described in the first exemplary embodiment (FIG. 3). FIG. 11 illustrates an example of an operation procedure of machine recognition processing to be performed by the client apparatus 210 when a machine recognition area is automatically specified as described in the second exemplary embodiment (FIG. 8).

First, FIG. 10 will be described. The processing in steps S300 to S304 in FIG. 10 is similar to the processing in steps S300 to S304 in FIG. 3. In FIG. 10, the processing in step S305 is not performed. The processing in steps S306 and S307 is similar to the processing in steps S306 and S307 in FIG. 3. In step S307, the image capturing apparatus 100 transmits an image to the client apparatus 210. The image is distributed (transmitted) to the image processing unit 905 via the network I/F 901 of the client apparatus 210. In FIG. 10, the processing in step S1000 is performed after the processing in step S307.

In step S1000, the image processing unit 905 of the client apparatus 210 performs machine recognition based on the distributed (transmitted) image. If spatial recognition processing is to be performed, the image processing unit 905 performs calculation and processing for performing machine recognition on the distributed image. If temporal recognition processing is to be performed, the image processing unit 905 saves an image in the memory 906 for each frame, and performs calculation and processing for performing machine recognition. For example, in performing face recognition, the image processing unit 905 calculates an evaluation value by comparing the distributed image with training data stored in the memory 906. As described above, the machine recognition processing in step S305 of FIG. 3 (performed by the image capturing apparatus 100) can be performed by the client apparatus 210 as illustrated in step S1000.

Next, FIG. 11 will be described. The processing in steps S800 to S802, S302 to S304, S306, S307, and S803 to S805 in FIG. 11 is similar to the processing in steps S800 to S802, S302 to S304, S306, S307, and S803 to S805 in FIG. 8. In FIG. 11, the processing in step S305 is not performed. In step S307, the image capturing apparatus 100 transmits an image to the client apparatus 210. The image is distributed (transmitted) to the image processing unit 905 via the network I/F 901 of the client apparatus 210. In FIG. 11, the processing in step S1000 is performed between the processing in steps S307 and S803.

In step S1100, the image processing unit 905 of the client apparatus 210 performs machine recognition based on the distributed (transmitted) image. This machine recognition processing is similar to the processing in step S1000 (FIG. 10), so that a description thereof will be omitted. As described above, the machine recognition processing in step S305 of FIG. 8 (performed by the image capturing apparatus 100) can be performed by the client apparatus 210 as illustrated in step S1100.

In the present exemplary embodiment, the method has been described for a transition setting of AE when machine recognition processing is to be performed by the client apparatus 210. According to the present exemplary embodiment, setting a transition setting of AE with different priorities to an area specified as a machine recognition area improves the detection accuracy of machine recognition, while an image can be output with high visibility in a non-machine recognition area. Further, determining which to be prioritized, the analog gain and the exposure time, depending on a recognition processing method for machine recognition allows a setting suited to the type of machine recognition to be set, improving the detection accuracy.

The above-described type of machine recognition includes temporal machine recognition (processing) and spatial machine recognition (processing). Further, machine recognition processing may be performed by either or both the image capturing apparatus 100 or/and the client apparatus 210.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-114572, filed Jul. 19, 2022, which is hereby incorporated by reference herein in its entirety.

What is claimed is:

1. An image capturing apparatus comprising:
an image sensor that can set exposure conditions for each exposure area having one or more pixels, the image sensor capturing an image with the set exposure conditions;
at least one processor; and
a memory in communication with the at least one processor, the memory storing instructions that, when performed by the processor, cause the processor to function as:
an acquisition unit configured to acquire an image recognition area where image recognition is to be performed by performing image processing on the image captured by the image sensor;
a determination unit configured to determine a transition setting of the exposure conditions to be applied to the exposure area corresponding to the image recognition area based on content of the image recognition; and
an image capturing control unit configured to perform image capturing through the image sensor by applying the transition setting of the exposure conditions determined by the determination unit,
wherein the exposure conditions include a gain and an exposure time, and
wherein the determination unit determines a priority of the gain and the exposure time in the transition setting depending on the content of the image recognition.

2. The image capturing apparatus according to claim 1, wherein the transition setting of the exposure conditions to be applied to the image recognition area is different from a transition setting of exposure conditions to be applied to an area other than the image recognition area.

3. The image capturing apparatus according to claim 2, wherein, in a case where the image recognition is to be performed based on a temporal change in luminance, the determination unit determines a transition setting that prioritizes the gain over the exposure time.

4. The image capturing apparatus according to claim 2, wherein, in a case where the image recognition is to be performed based on a spatial change in luminance, the determination unit determines a transition setting that prioritizes the exposure time over the analog gain.

5. The image capturing apparatus according to claim 1, wherein the determination unit determines a transition setting of the exposure conditions depending on a type of the image recognition or accuracy for the image recognition.

6. The image capturing apparatus according to claim 5, wherein the acquisition unit acquires the image recognition area based on area specification information provided from an outside.

7. The image capturing apparatus according to claim 5, further comprising a specification unit configured to specify the image recognition area based on a result of the image recognition,
wherein the acquisition unit acquires the image recognition area based on a specification specified by the specification unit.

8. The image capturing apparatus according to claim 1, further comprising a changing unit configured to change a setting of the image recognition area based on a detection result of the image recognition.

9. The image capturing apparatus according to claim 1, further comprising an image capturing optical system,
wherein the determination unit determines a transition setting of the exposure conditions to be applied to the image recognition area by using luminance of the pixel and optical information about the image capturing optical system in addition to the content of the image recognition.

10. The image capturing apparatus according to claim 1, wherein the content of the image recognition includes at least one of a type of the image recognition, an object to be recognized through the image recognition, or a region of the object.

11. The image capturing apparatus according to claim 1, further comprising a processing unit configured to perform image processing for the image recognition.

12. The image capturing apparatus according to claim 1, wherein the image capturing apparatus transmits the image captured by the image sensor to an external information processing apparatus, and the image processing apparatus performs the image recognition.

13. A control method for an image capturing apparatus including an image sensor that can set exposure conditions for each exposure area having one or more pixels, the method comprising:
acquiring an image recognition area where image recognition is to be performed by performing image processing;
determining a transition setting of the exposure conditions to be applied to the image recognition area based on content of the image recognition; and
performing image capturing through the image sensor by using the transition setting of the determined exposure conditions,
wherein the exposure conditions include a gain and an exposure time, and
wherein the determination unit determines a priority of the gain and the exposure time in the transition setting depending on the content of the image recognition.

14. A non-transitory computer-readable storage medium storing a program for performing a control method for an image capturing apparatus including an image sensor that can set exposure conditions for each exposure area having one or more pixels, the method comprising:
acquiring an image recognition area where image recognition is to be performed by performing image processing;
determining a transition setting of the exposure conditions to be applied to the image recognition area based on content of the image recognition; and
performing image capturing through the image sensor by using the transition setting of the determined exposure conditions,
wherein the exposure conditions include a gain and an exposure time, and
wherein the determination unit determines a priority of the gain and the exposure time in the transition setting depending on the content of the image recognition.

* * * * *